US008792539B2

(12) United States Patent
Larsson

(10) Patent No.: US 8,792,539 B2
(45) Date of Patent: Jul. 29, 2014

(54) MULTIPLICATIVE NETWORK CODING

(75) Inventor: Peter Larsson, Solna (SE)

(73) Assignee: Telefonaktiebolaget L.M. Ericsson (Publ), Stockholm (SE)

( * ) Notice: Subject to any disclaimer, the term of this patent is extended or adjusted under 35 U.S.C. 154(b) by 284 days.

(21) Appl. No.: 12/679,345

(22) PCT Filed: Jul. 10, 2008

(86) PCT No.: PCT/SE2008/050861
§ 371 (c)(1),
(2), (4) Date: Mar. 22, 2010

(87) PCT Pub. No.: WO2009/041884
PCT Pub. Date: Apr. 2, 2009

(65) Prior Publication Data
US 2010/0208836 A1   Aug. 19, 2010

Related U.S. Application Data

(60) Provisional application No. 60/975,552, filed on Sep. 27, 2007.

(51) Int. Cl.
*H04B 1/38* (2006.01)

(52) U.S. Cl.
USPC .................... 375/220; 375/219; 375/267

(58) Field of Classification Search
USPC .................................................. 375/219–220
See application file for complete search history.

(56) References Cited

U.S. PATENT DOCUMENTS

| 4,521,779 | A | * | 6/1985 | Lewis | 342/194 |
| 5,391,996 | A | * | 2/1995 | Marz | 327/158 |
| 2004/0266354 | A1 | * | 12/2004 | Hamada et al. | 455/63.4 |
| 2007/0047626 | A1 | * | 3/2007 | Elias | 375/141 |

FOREIGN PATENT DOCUMENTS

| CN | 1735079 A | 2/2006 |
| CN | 1917384 A | 2/2007 |
| WO | WO 2006/016320 A1 | 2/2006 |
| WO | WO 2006/071187 A2 | 7/2006 |
| WO | WO 2006071187 A2 * | 7/2006 |
| WO | WO 2007/008123 A1 | 1/2007 |

OTHER PUBLICATIONS

"Network Information Flow," R. Ahlswede et al., IEEE Transactions on Information Theory, vol. 46, No. 4, Jul. 2000, pp. 1204-12-16.

(Continued)

*Primary Examiner* — Sam K Ahn
*Assistant Examiner* — Janice Tieu
(74) *Attorney, Agent, or Firm* — Myers Bigel Sibley & Sajovec, P.A.

(57) ABSTRACT

Network coding may be performed with encoding and/or decoding that involves a multiplication operation. A communication node is adapted to perform multiplicative network coding. The communication node includes an encoder and a decoder. The encoder is arranged to perform an encoding operation by multiplying two or more signals that bear information to form a composite signal. The decoder is arranged to perform a decoding operation by multiplying a received composite signal with one or more complex-conjugated signals, with the decoder yielding a decoded signal that bears information. With the encoding operation, the communication node is adapted to at least partially perform multiplicative-network-coding encoding for a sending communication mode. With the decoding operation, the communication node is adapted to at least partially perform multiplicative-network-coding decoding for a receiving communication mode.

19 Claims, 8 Drawing Sheets

(56) References Cited

OTHER PUBLICATIONS

"Reversible and Irreversible Information Networks," S. RIIS, IEEE Transactions on Information Theory, vol. 53, No. 11, Nov. 2007, pp. 4339-4349.

"Insufficiency of Linear Coding in Network Information Flow," R. Dougherty et al., IEEE Transactions on Information Theory, vol. 51, No. 8, Aug. 2005, pp. 2745-2759.

"A Multiplicative and Constant Modulus Signal Based Network Coding Method Applied to CB-Relaying," P. Larsson, Ericsson Research, IEEE, 978-1-4244-1645-5/08, May 2008, pp. 61-65.

"Physical Layer Differential Network Coding for Two-way Relay Channels," T. Cui et al., IEEE GLOBECOM, Nov. 30, 2008-Dec. 4, 2008, pp. 1-5.

First Office Action and English language translation, Chinese Patent Application No. 200880109071.8, Aug. 31, 2012.

European Search Report corresponding to European Application No. 08779438.4-1851 / 2193619, dated Feb. 12, 2014, 3 pages.

Ingmar Hammerstrom et al: "MIMO two-way relaying with transmit CSI at the relay", Signal Processing Advances in Wireless Communications, 2007—SPAWC 2007—IEEE $8^{th}$ Workshop on, IEEE, XX, Jun. 1, 2007, pp. 1-5, XP031189501, ISBN: 978-1-4244-0954-9 * section 2 *.

* cited by examiner

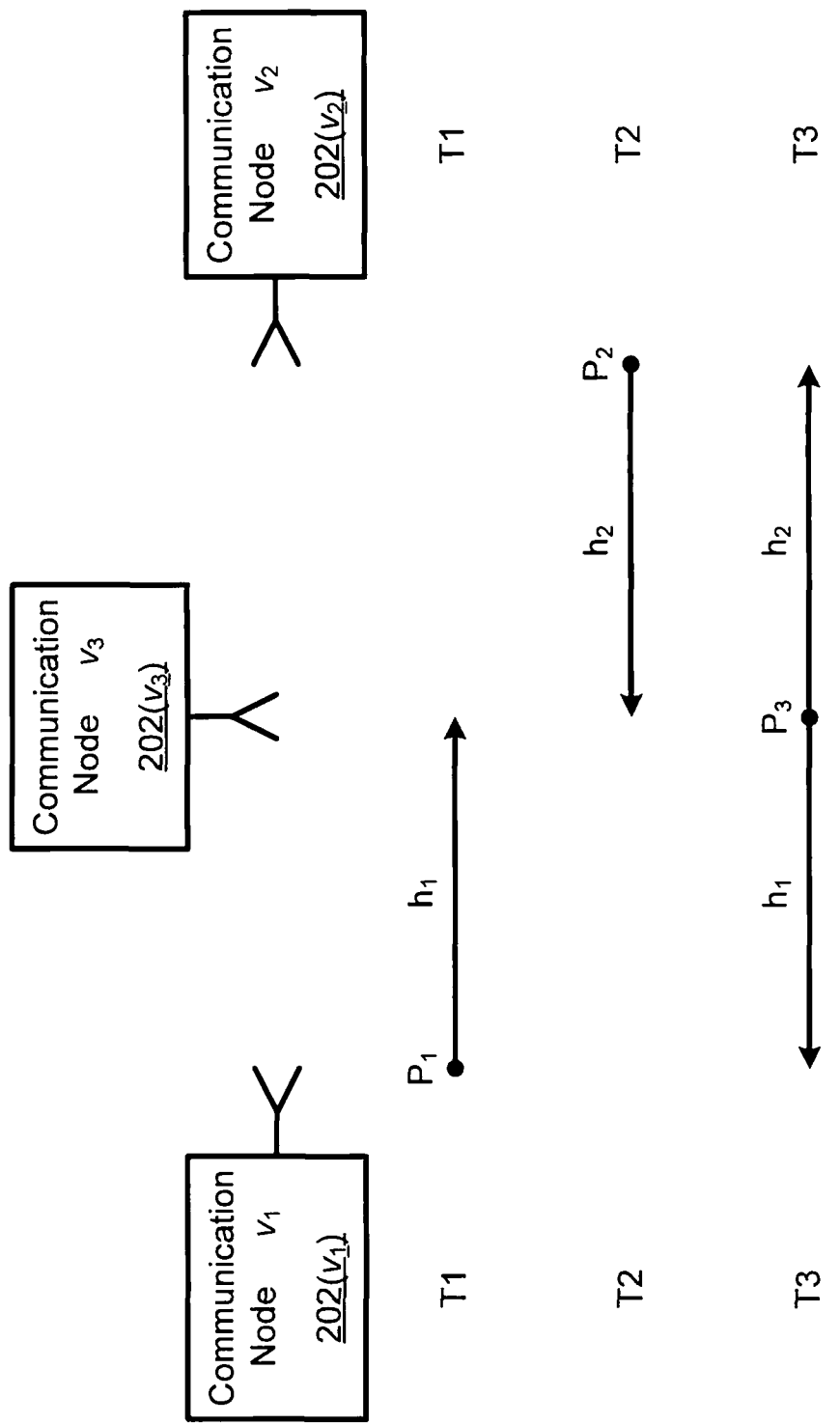

MULTIPLICATIVE NETWORK CODING

CROSS-REFERENCE(S) TO RELATED APPLICATION(S)

This U.S. Nonprovisional patent application claims the benefit of U.S. Provisional Patent Application 60/975,552, filed on 27 Sep. 2007 and entitled "Multiplicative En-/Decoding Method for Unitary Signals in Network Coding".

TECHNICAL FIELD

The present invention relates generally to the performance of network coding in communications systems.

BACKGROUND

Many specialized terms and abbreviations are used in the communications arts. At least some of the following are referred to within the text that follows, such as in this background and/or the description sections. Accordingly, the following terms and abbreviations are herewith defined:

4-QAM 4-Quadrature Amplitude Modulation
ARQ Automatic Repeat Request
AWGN Additive White Gaussian Noise
BPSK Binary Phase Shift Keying
CBR Coded Bi-directional Relaying
CRC Cyclical Redundancy Checking
CS Composite Signal
DPC Dirty Paper Coding
FEC Forward Error Correction
GF Galois Field
MRC Maximum Ratio Combining
MU-ARQ Multi-User ARQ
NACK Negative ACKnowledgment
NC Network Coding
OFDM Orthogonal Frequency Division Multiplexing
OFDMA Orthogonal Frequency Division Multiple Access
PAM Pulse Amplitude Modulated (signal)
PSK Phase Shift Keying
SINR Signal-to-Interference Noise Ratio
SNR Signal-to-Noise Ratio Data, voice, multimedia, and other communications are the foundation of the modern information-oriented world. Such information is typically communicated over a network or networks. These networks may be public or private, packet-switched or circuit-switched, wireless or wired, some combination thereof, and so forth. Networks may operate under any of many different protocols and standards. Regardless, most networks include multiple nodes that each receive a communication from one node and then forward or otherwise transmit the communication to another node to propagate the information.

The communication of a set of related information pieces over a network is typically termed an information flow. The information flow is transmitted from node to node over the network. An information flow may be propagated over a single network or over multiple networks of the same or different types.

Traditionally, the coding of information for security, redundancy, bandwidth efficiency, or other reasons has been performed at the information flow level. Routing of information over the nodes of a network, on the other hand, has been performed at the network level. Thus, there has traditionally been a separation of coding to the information flow level and routing to the network level. This separation, however, may be changed in accordance with the concept of network coding.

The concept of network coding is relatively recent—it was first introduced in 2000. Network coding has the potential to improve communication in networks, both fixed networks and wireless networks. Theoretically, fixed/wired networks are free in principle of both noise and errors. (In reality, fixed networks may suffer from either or both of noise and errors.) Wireless networks, on the other hand, are commonly modeled with noise and interference that are individually and jointly capable of inducing errors in communications.

Generally, performing network coding involves mixing different pieces of information from different flows. This means that the notion of coding, which is historically performed on a link or flow level, is being moved up to the network level where multiple links and flows exist. A classical example illustrating network coding is from a seminal network coding paper entitled "Network Information Flow" and published in 2000 by R. Ahlswede, N. Cai, S.-Y. R. Li, and R. W. Yeung in IEEE Transactions on Information Theory (IT-46, pp. 1204-1216, 2000). This classical example is shown in FIG. 1.

FIG. 1 is an example network diagram 100 in which a conventional approach to network coding is implemented among communication nodes. As illustrated, network diagram 100 includes six communication nodes: a, b, c, d, e, and f. There are two information flows: A and B. The two sources of the information flows are nodes a and b. The two destinations for the information flows are nodes e and f.

Network diagram 100 illustrates how the two source nodes a and b initiate the info A and B, respectively, into the network. Both info A and info B are ultimately to be sent to both of the two destination nodes e and f. Node a transmits info A to node e. Node b transmits info B to node f.

The source nodes a and b also transmit info A and info B, respectively, to an intermediate node c. Node c creates a modulo sum A+B from info A and info B. The modulo sum may be created, for example, from a modulo-2 operation. A modulo-2 operation is equivalent to a bitwise exclusive OR (XOR) operation. This creation of a modulo sum is an encoding part of a conventional network coding operation.

Intermediate node c then forwards the modulo sum A+B to nodes e and f. As shown, the modulo sum A+B is forwarded to nodes e and f indirectly via another intermediate node d. After receiving the modulo sum A+B from node c, node d forwards it to both node e and node f. Because node e already knows info A, node e can determine info B from the modulo sum A+B. Similarly, node f can determine info A from the modulo sum A+B because it already knows info B. The retrieval of info B from the modulo sum A+B by node e using info A and the retrieval of info A from the modulo sum A+B by node f using info B are decoding parts of a conventional network coding operation.

By sending the packet with the modulo sum A+B, instead of individual packets for info A and info B in turn, it can be shown that the throughput may be increased and that the delay may be decreased. Thus, increasing throughput and/or decreasing delays in a network are benefits that may be attained when implementing network coding generally.

The example above performs conventional network coding using encoding and decoding operations having an XOR functionality, which is a modulo-2 operation. However, network coding has also been extended to addition in larger field sizes, at least in randomized settings.

Other advancements have been developed in network coding since its introduction in 2000. For example, a relationship between dirty paper coding (DPC) and network coding operations has been drawn by Peter Larsson et al. This relationship is explained further in two Published PCT Patent Applications to Peter Larsson, who is the inventor of the instant Patent Application, and two co-inventors Niklas Johansson and Kai-Erik Sunell. These two PCT Patent Applications are: [1] PCT Published Application No. WO 2006/071187, entitled "Method and Arrangement for Bi-Directional Relaying in Wireless Communication Systems" and published on 6 Jul. 2006 by applicant Telefonaktiebolaget L M Ericsson and [2] PCT Published Application No. WO 2007/008123, entitled "Method and Arrangement for Coding and Scheduling in Packet Data Communication Systems" and published on 18 Jan. 2007 by applicant Telefonaktiebolaget L M Ericsson. The former Application addresses coded bi-directional relaying (CBR), and the latter Application addresses Multi-User ARQ (MU-ARQ).

In these Published PCT Patent Applications, there is description that the encoding and decoding operations need not be based solely on finite fields. Instead, a linear additive modulus operation may be employed for encoding and decoding operations. More precisely, assuming two random variables $x_1$ and $x_2$ that are uniformly distributed over $[-\frac{1}{2}, \frac{1}{2}]$, the encoding operation may be $y=(x_1+x_2) \mod \Lambda$. The corresponding decoding operation, e.g. for $x_1$, may be $(y-x_2) \mod \Lambda = x_1$.

The mod $\Lambda$ in this instance (e.g., with $\Lambda=1$) means that for any value larger than $\frac{1}{2}$ or less than $-\frac{1}{2}$, a suitable integer number is subtracted or added, respectively, to fold the resulting number into the range $[-\frac{1}{2}, \frac{1}{2}]$. Although the linear additive modulus operation is described here in terms of one dimension, it is not limited to a single dimension.

Despite advancements in the field of network coding since its introduction in 2000, a number of deficiencies or weaknesses remain. For example, although existing network coding operations (e.g., finite field summations and the additive modulus operation) work fairly well in certain situations, they are a bit tricky to use in other situations. For instance, existing implementations of network coding can be finicky in noisy channels. Firstly, classical network coding operations with finite fields are intended to be used on forward error correction (FEC) decoded, error-free messages.

Secondly, with the additive modulus operation for encoding and decoding, a network coding implementation may operate on noisy baseband signals prior to FEC decoding. However, the decoding node benefits more from ascertaining precise channel states in order to do a "perfect" cancellation of the undesired, but "known" interfering signal. This precise knowledge and perfect cancellation can be difficult to achieve in real-world implementations.

Thus, deficiencies and weaknesses of conventional network coding include needing FEC-decoded, error-free messages and needing precise knowledge of interfering signals and perfect cancellation thereof in noisy environments to achieve a given level of service. These deficiencies and weaknesses, as well as other drawbacks of conventional network coding, are addressed by one or more of the various embodiments of the present invention.

SUMMARY

It is an object of the present invention to facilitate performance of network coding in different environments. For certain embodiments, different environments may include relatively noisy ones. Network coding may be performed with encoding and/or decoding that involves a (e.g., complex-valued) multiplication operation.

In an example embodiment, a communication node is adapted to perform multiplicative network coding. The communication node includes an encoder and a decoder. The encoder is arranged to perform an encoding operation by multiplying two or more signals that bear information to form a composite signal. The decoder is arranged to perform a decoding operation by multiplying a received composite signal with one or more complex-conjugated signals, with the decoder yielding a decoded signal that bears information. With the encoding operation, the communication node is adapted to at least partially perform multiplicative-network-coding encoding for a sending communication mode. With the decoding operation, the communication node is adapted to at least partially perform multiplicative-network-coding decoding for a receiving communication mode.

In another example embodiment, there is a memory including processor-executable instructions adapted to perform multiplicative network coding that, when executed, direct a communication node to perform a number of acts. The acts include: forming, transmitting, receiving, and yielding. A composite signal is formed by multiplying two or more information-bearing signals in an encoding operation. The composite signal is transmitted. Another composite signal is received. A decoded signal that bears information is yielded by multiplying the received composite signal with one or more complex-conjugated signals in a decoding operation. With the act of forming, the communication node is adapted to at least partially perform multiplicative-network-coding encoding for a sending communication mode. With the act of yielding, the communication node is adapted to at least partially perform multiplicative-network-coding decoding for a receiving communication mode.

In yet another example embodiment, there is a method for a communication node adapted to perform multiplicative-network-coding encoding. The method includes acts of: receiving a first signal, receiving a second signal, forming, and transmitting. The first signal bearing first information is received. The second signal bearing second information is received. A composite signal is formed by multiplying the first signal by the second signal in an encoding operation, with the composite signal bearing multiplicatively-network-coded first information and second information. The composite signal is transmitted to another node. Thus, the communication node is adapted to at least partially perform multiplicative-network-coding encoding with the forming of the composite signal.

In yet another example embodiment, there is a method for a communication node adapted to perform multiplicative-network-coding decoding. The method includes acts of receiving a second signal, creating, receiving a composite signal, and retrieving. The second signal bearing second information is received. A complex conjugate of the second signal is created. The composite signal is received, with the composite signal bearing multiplicatively-network-coded information including first information and the second information. A first signal is retrieved by multiplying the composite signal by the complex conjugate of the second signal, with the retrieved first signal bearing the first information. Thus, the communication node is adapted to at least partially perform multiplicative-network-coding decoding with the retrieval of the first signal.

In yet another example embodiment, there is a system that is adapted to perform multiplicative network coding. The system includes a first communication node and a second communication node. The first communication node includes a multiplicative encoder, a transmitter, and a first receiver. The first receiver is adapted to receive a first signal bearing first information and a second signal bearing second information. The multiplicative encoder is adapted to form a composite signal by multiplying the first signal and the second signal, with the composite signal bearing multiplicatively-network-coded information including the first information and the second information. The transmitter is adapted to transmit the composite signal. The second communication node includes a multiplicative decoder and a second receiver. The second receiver is adapted to receive the composite signal from the transmitter of the first communication node. The second receiver is also adapted to receive the second signal bearing the second information. The multiplicative decoder is adapted to create a complex conjugate of the second signal. The multiplicative decoder is also adapted to retrieve the first signal by multiplying the composite signal by the complex conjugate of the second signal, with the retrieved first signal bearing the first information.

An advantage of certain embodiment(s) of the present invention is that the benefit(s) of network coding may be extended to performing encoding and decoding operations for noisy signals and/or channel-affected signals.

Another advantage of certain embodiment(s) of the present invention is that network coding benefit(s) may be obtained without needing to know channel states for the purpose of canceling any interfering signal or signals.

Yet another advantage of certain embodiment(s) of the present invention is that the benefit(s) of network coding may be extended to wireless networks in noisy environments.

Additional aspects of the invention are set forth, in part, in the detailed description, drawings, and claims that follow, and in part may be derived from the detailed description, or can be learned by practice of the invention. It is to be understood that both the foregoing general description and the following detailed description are exemplary and explanatory only and are not restrictive of the invention as disclosed or as claimed.

BRIEF DESCRIPTION OF THE DRAWINGS

A more complete understanding of the present invention may be obtained by reference to the following detailed description when taken in conjunction with the accompanying drawings wherein:

FIG. 8 is a diagram illustrating an example CBR scenario using multiplicative network coding with three communication nodes.

DETAILED DESCRIPTION

In example embodiments, multiplicative network coding involves combining information flows using at least one multiplication operation. In an example encoding operation, a sending node multiplies two or more information-bearing signals to form a composite signal. This composite signal is communicated from the sending node to a receiving node. In an example decoding operation, the receiving node multiplies the received composite signal with one or more complex-conjugated signals. Each complex-conjugated signal may be previously received at the receiving node and/or transmitted from the receiving node, and hence previously stored thereat. Each complex-conjugated signal may bear information and/or may itself be a composite signal. The information-bearing signals, the complex-conjugated signal (s), or both may have a noise component.

More specifically, example embodiments provide encoding and/or decoding operations for multiplicative network coding. Information-bearing signals have a phase domain and carry information in the phase domain. Additionally, each signal may have a constant absolute magnitude, at least from symbol to symbol and possibly across each of the signals.

In an example encoding operation, a sending node multiplies two or more information-bearing signals to form a composite signal. Each of these signals may or may not have a noise component. However, noise components are preferably absent for performance reasons. In an example decoding operation, a receiving node multiplies a received composite signal with one or more complex-conjugated signals, which may be information-bearing signals or composite signals. These complex-conjugated signals may have been previously received or transmitted and thus stored. The signals for the decoding operation may or may not have unknown noise components, but preferably noise components are absent for performance reasons.

These operations enable multiplicative network coding and are suitable for both encoding and decoding. They may be used with unitary signals. For certain embodiments, the decoding does not, in contrast with conventional approaches, need perfect knowledge of channel states for canceling network coded messages, nor does it need to perform FEC decoding prior to network-coding decoding. Included in the description below are example applications of multiplicative network coding. These example applications include CBR and MU-ARQ. Multiplicative network coding may also be used in DPC, particularly when the interference is multiplicative rather than additive.

Figure 2:
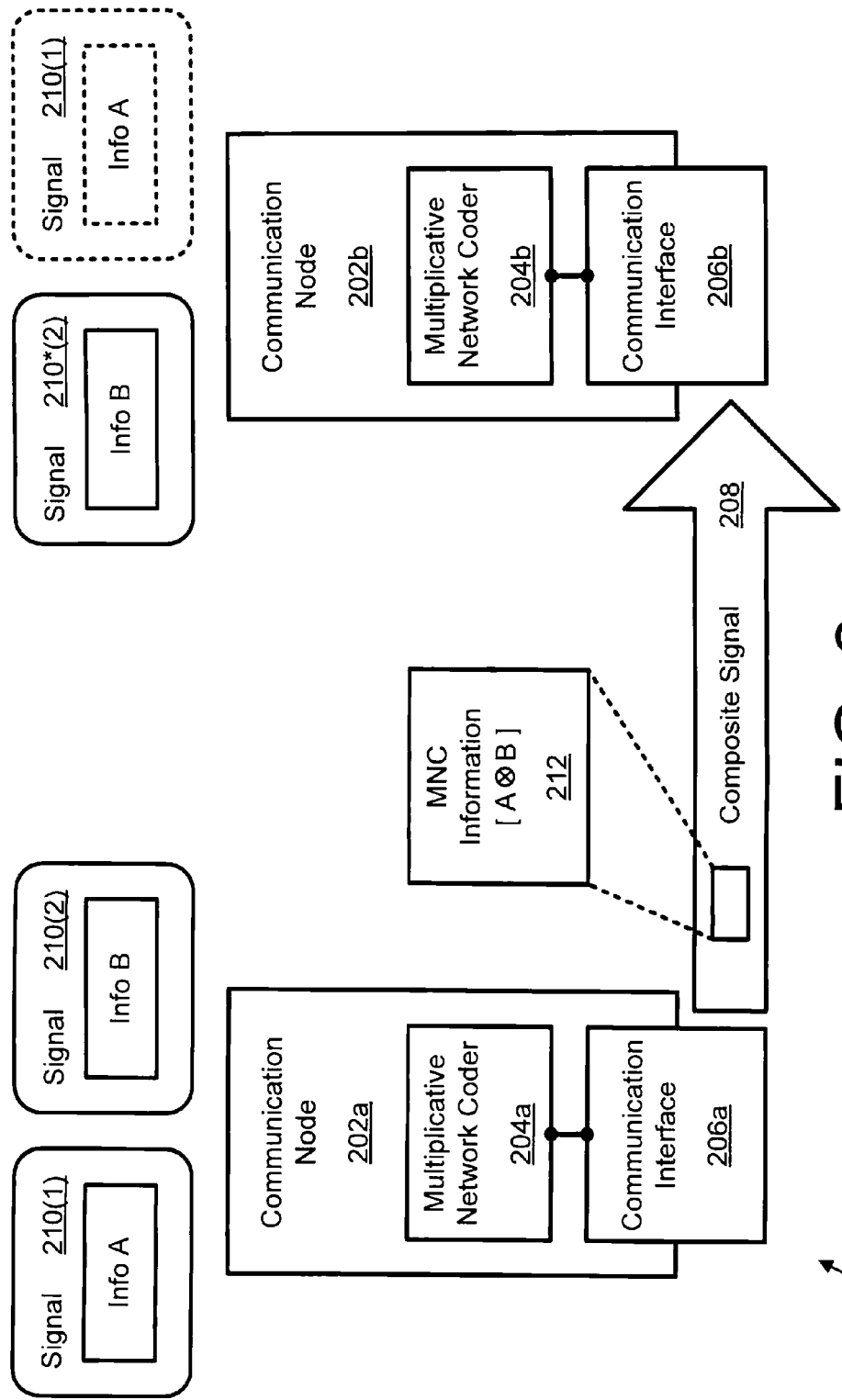
FIG. 2 illustrates an example communication of a composite signal between two communication nodes that are adapted to perform multiplicative network coding.

FIG. 2 illustrates an example communication of a composite signal 208 between two communication nodes 202 that are adapted to perform multiplicative network coding. As illustrated, a system 200 includes a first communication node 202a and a second communication node 202b. First communication node 202a stores or otherwise has access to two or more signals 210. More specifically, a signal 210(1) bears information A, and a signal 210(2) bears information B.

In an example embodiment, first communication node 202a includes a first multiplicative network coder 204a and a first communication interface 206a. Second communication node 202b includes a second multiplicative network coder 204b and a second communication interface 206b. Second communication node 202b stores or otherwise has access to at least one complex-conjugated signal. For example, second communication node 202b has access to complex-conjugated signal 210*(2), which bears information B.

In an example encoding operation, first multiplicative network coder 204a forms a composite signal 208 by multiplying two or more information bearing signals 210, such as signal 210(1) and signal 210(2). Composite signal 208 therefore comprises multiplicatively-network-coded (MNC) information 212. In other words, signal 210(1) bearing information A and signal 210(2) bearing information B may be multiplied together to form composite signal 208 including or carrying MNC information 212. MNC information 212 may therefore be represented in this instance by A⊗B. First multiplicative network coder 204a provides composite signal 208 to first communication interface 206a.

First communication node 202a transmits via first communication interface 206a composite signal 208 directly or indirectly to second communication node 202b. Second communication node 202b receives composite signal 208 via second communication interface 206b. Second communication interface 206b provides composite signal 208 to second multiplicative network coder 204b.

In an example decoding operation, second multiplicative network coder 204b multiplies composite signal 208 with one or more complex-conjugated signals to yield a desired signal, such as a signal 210(1) or 210(2). In this example, second multiplicative network coder 204b already has access to complex-conjugated signal 210*(2) corresponding to information B. Alternatively, second multiplicative network coder 204b creates complex-conjugated signal 210*(2) from signal 210(2) that bears information B. Thus, second multiplicative network coder 204b multiplies composite signal 208 by complex-conjugated signal 210*(2) to yield signal 210(1) that bears information A.

Figure 3:
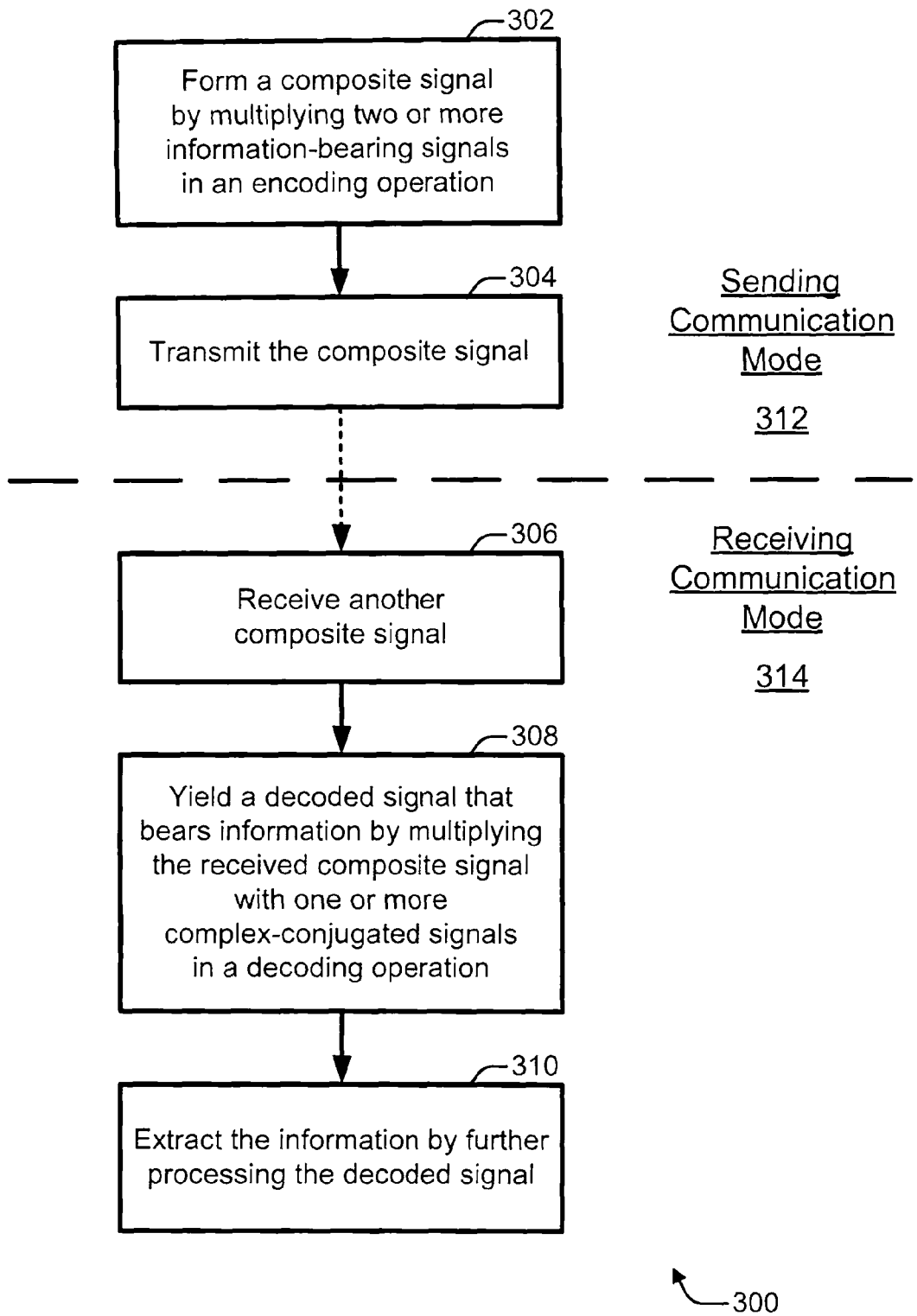
FIG. 3 is a flow diagram of a method for an example embodiment of multiplicative network coding with one communication node.

FIG. 3 is a flow diagram 300 of a method for an example embodiment of multiplicative network coding with one communication node. As illustrated, flow diagram 300 includes five blocks 302, 304, 306, 308, and 310. The method may be performed by a single communication node, such as a communication node 202 (of FIG. 2 or 5). Flow diagram 300 is divided into a sending communication mode 312 and a receiving communication mode 314.

Sending communication mode 312 includes blocks 302-304 and involves an encoding operation. Receiving communication mode 314 includes blocks 306-310 and involves a decoding operation. A single communication node may be in a sending mode for one information flow and multiplicative network coding procedure and may be in a receiving mode for another information flow and multiplicative network coding procedure.

In an example embodiment, at block 302, a composite signal is formed by multiplying two or more information-bearing signals in an encoding operation. Each respective information-bearing signal may be associated with a respective information flow. At block 304, the composite signal is transmitted from the communication node. For a communication node that has a sending communication mode and a receiving communication mode, it may also be receiving a different composite signal and performing a decoding operation on it.

At block 306, another composite signal is received at the communication node. At block 308, the communication node yields a decoded signal that bears information by multiplying the received composite signal with one or more complex-conjugated signals in a decoding operation. Each complex-conjugated signal may be an information-bearing signal or a composite signal. At block 310, the information carried by the decoded signal is extracted by further processing of the decoded signal. Such further processing may include, for example, FEC decoding, demodulation, a combination thereof, and so forth.

Figure 4:
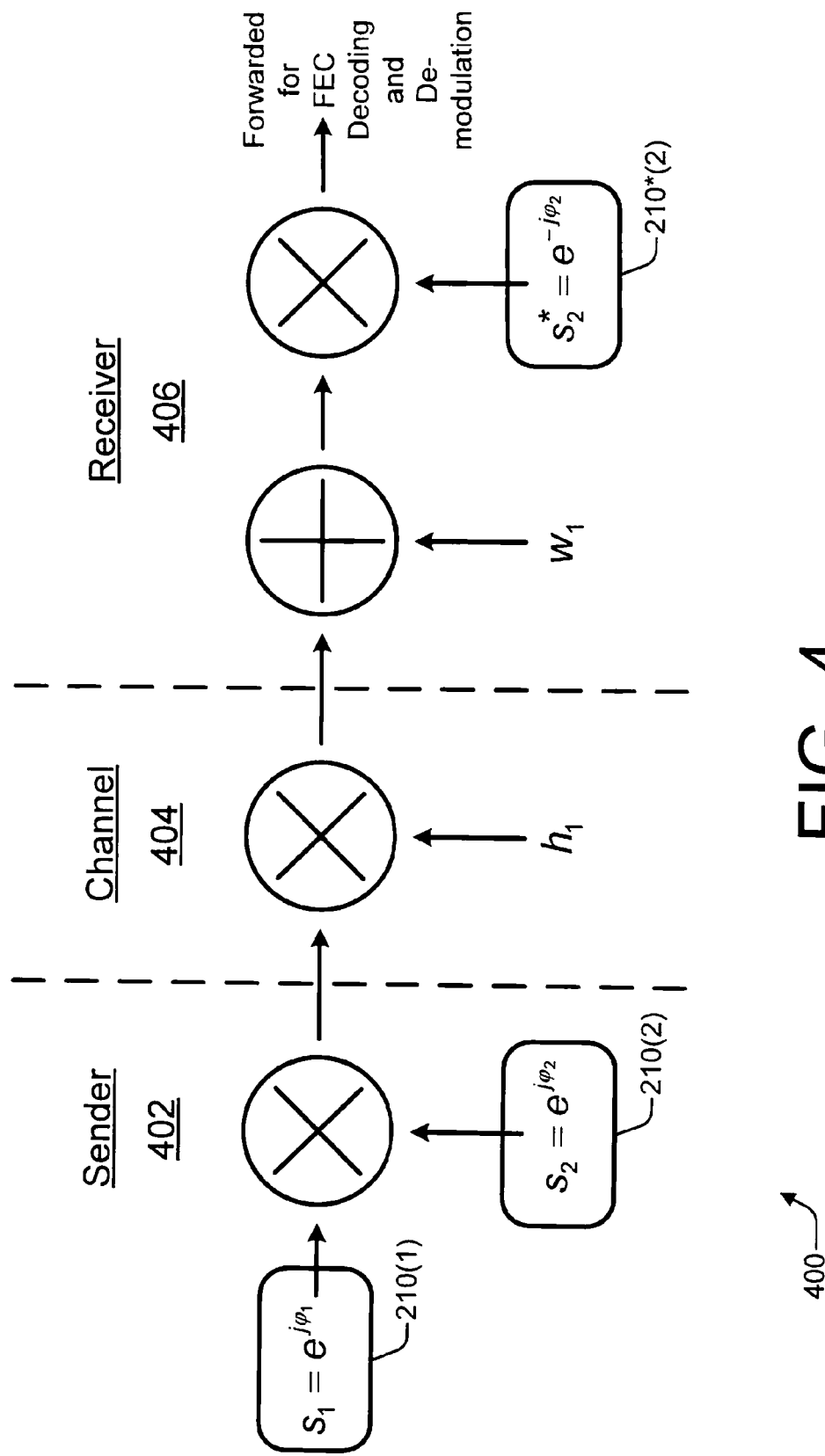
FIG. 4 is a diagram illustrating an example multiplicative network coding procedure.

FIG. 4 is a diagram illustrating an example multiplicative network coding procedure 400. As illustrated, multiplicative network coding procedure 400 includes a sender 402, a channel 404, and a receiver 406. It also involves information-bearing signals 210(1) and 210(2), as well as complex-conjugated signal 210*(2).

In an example embodiment generally, signal 210(1) and signal 210(2) are multiplied together to form a composite signal. Channel effects from transmitting the composite signal across channel 404 are represented by $h_1$. At receiver 406, the effects of noise on the signal are represented by $w_1$. It should be noted that the noise $w_1$ may originate from a source external to receiver 406 as well as from the receiver itself. Receiver 406 multiplies the resulting channel-affected and noisy signal by complex-conjugated signal 210*(2). This yields a decoded signal corresponding to information-bearing signal 210(1). The decoded signal is forwarded for additional processing, such as FEC decoding and demodulation to extract the desired information that the decoded signal carries.

More specifically, signals 210 are defined to be $s_k(n) = e^{j\Phi_k(n)}$, where n is a index for a symbol carrying a piece of information, and k is the index for the full information to which the signal belongs (e.g., data word k). For the sake of notation simplicity, the symbol index n is dropped herein below, and signals are therefore represented by $s_k = e^{j\Phi_k}$.

For the sake of clarity, it is assumed herein below that the communication channel is flat or that OFDM is used such that the channel is flat for the subcarrier under consideration. Similarly, it is given that $|s_k(n)|=1$. In words, it is given that the power is relatively constant for a signal, at least from symbol to symbol. More specifically, it is given that the magnitudes of each of the signals are substantially equal and approximately identical to unit value. Thus, for such embodiments, information may be carried in the phase domain of such signals, but it need not be carried in their magnitude. Values may be relatively constant, substantially equal, or approximately identical within reasonable tolerances to which the underlying communication technologies are capable of attaining and/or to achieve a targeted level of acceptable error, SNR, SINR, and so forth.

In an example operation, it is given that receiver 406 knows a signal $s_2 = e^{j\Phi_2}$. A composite signal $s_1 s_2 = e^{j\Phi_1} \cdot e^{j\Phi_2} = e^{j(\Phi_1+\Phi_2)}$ is formed from signals 210(1) and 210(2) at sender 402 and sent over channel 404 to receiver 406. Signal 210(1), or $s_1$, is unknown at receiver 406. Receiver 406 wants to retrieve signal 210(1) from the received noisy and attenuated composite signal $r = h\sqrt{p} s_1 s_2 + w$, where h is the complex channel magnitude, p is the transmit power, and w is the noise. In this case, the noise is modeled as additive white Gaussian noise (AWGN).

Receiver 406 has knowledge of signal 210(2), or $s_2$. This signal $s_2$ may be, e.g., reconstructed from a previously received signal and associated decoded data. The reconstruction potentially includes protocol headers, CRC, FEC, modulation, some combination thereof, and so forth. Receiver 406 creates complex-conjugated signal 210*(2), or $s^*_2$, and calculates $rs^*_2$. This yields $rs^*_2 = (h\sqrt{p} s_1 s_2 + w)s^*_2 = h\sqrt{p} s_1 + w'$, where w' is AWGN with effectively the same statistics as w.

Thus, for example embodiments, multiplicative-network-coding encoding and decoding operations with unit magnitude and phase modulated signals need not affect the communication performance. Moreover, for the multiplicative-network-coding decoding operation, in contrast with DPC, the receiver does not need to know the value of the channel h. Additionally, the receiver need not do equalization prior to, or even after, a multiplicative-network-coding decoding operation. Example modulation schemes that may be adopted in conjunction with multiplicative network coding include, but are not limited to, PSK, 4-QAM, BPSK, and so forth.

Figure 5:
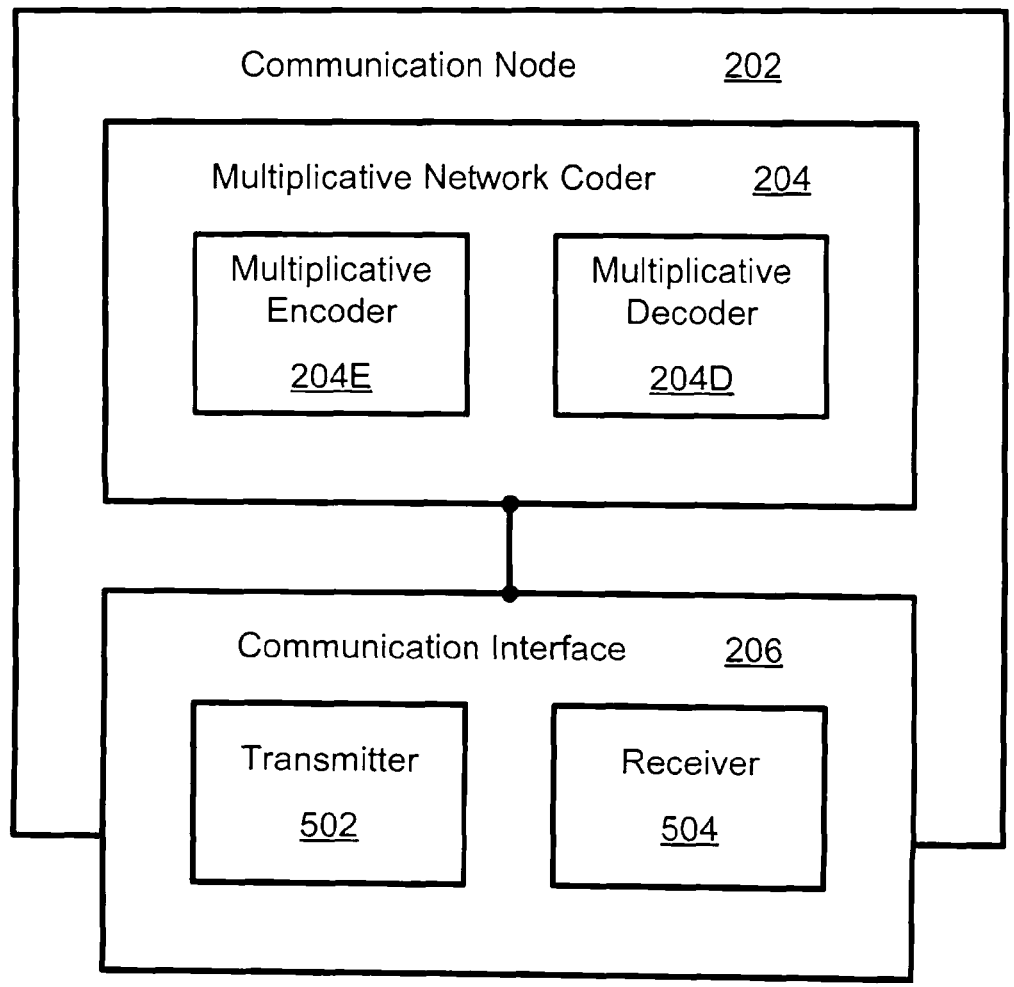
FIG. 5 is a block diagram of an example communication node.

FIG. 5 is a block diagram of an example communication node 202. As illustrated, communication node 202 includes a multiplicative network coder 204 and a communication interface 206. Multiplicative network coder 204 includes a multiplicative encoder 204E and a multiplicative decoder 204D. Communication interface 206 includes a transmitter 502 and a receiver 504.

In an example embodiment, multiplicative network coder 204 is operatively coupled to communication interface 206 for providing or forwarding signals or other information between them. Multiplicative encoder 204E is adapted to perform multiplicative-network-coding encoding operations. Multiplicative decoder 204D is adapted to perform multiplicative-network-coding decoding operations. Although multiplicative network coder 204 is shown as having both a multiplicative encoder 204E and a multiplicative decoder 204D, a communication node 202 may have only one if it is to operate in only a sending communication mode 312 (of FIG. 3) or a receiving communication mode 314, respectively.

Transmitter 502 is capable of transmitting signals from communication node 202 over one or more communication links (not explicitly shown). Receiver 504 is capable of receiving signals at communication node 202 from one or more communication links. Transmitter 502 and receiver 504 may be jointly realized as a transceiver. The links may be wireless links, wired links, both or a combination thereof, and so forth.

Generally, communication node 202 is adapted to perform multiplicative network coding. In an example embodiment, multiplicative encoder 204E is adapted to perform an encoding operation. Multiplicative decoder 204D is adapted to perform a decoding operation. During multiplicative network coding operations, multiplicative encoder 204E is arranged to multiply two or more signals 210 (of FIGS. 2 and 4) that bear information to form a composite signal 208.

Multiplicative decoder 204D is arranged to multiply a received composite signal 208 with one or more complex-conjugated signals 210*. From the decoding operation(s), multiplicative decoder 204D is to yield a decoded signal that bears information. Thus, communication node 202 is adapted to perform multiplicative network encoding for a sending communication mode 312 with the encoding operation and is adapted to perform multiplicative network decoding for a receiving communication mode 314 with the decoding operation.

Communication node 202 may be realized as a device, machine, equipment, module, a combination thereof, and so forth. Although not explicitly illustrated, a communication node 202 may include, for example, one or more processors, at least one memory, and processor-executable instructions. The at least one memory may include the processor-executable instructions. The one or more processors are operatively coupled to the memory. The processor(s) are capable of executing the processor-executable instructions to effectuate performance of functions and/or to perform acts that are described herein. For instance, the acts of flow diagram 300 and 600 (of FIGS. 3 and 6), as well as the other features and procedures described herein, may be realized with processor-executable instructions. Processor-executable instructions may be embodied as hardware, firmware, software, fixed logic circuitry, combinations thereof, and so forth.

Thus, each communication node 202 may be realized as a device, a machine, equipment, a module, some combination thereof, and so forth. Examples include, but are not limited to, a base station controller (BSC), a base transceiver station (BTS), a general packet radio service (GPRS) node, a gateway GPRS service node (GGSN), a mobile station (MS), a mobile telephony application server (MTAS), a media gateway (MGw), a mobile switching center (MSC), a Node B UMTS base station, a packet data serving node (PDSN), a radio base station (RBS), a radio network controller (RNC), a serving GPRS service node (SGSN), a subscriber station (SS), a user equipment (UE), a wired telecommunications network node, an internet node, a mesh network node, a router or switch, an access point, a module coupled to another device, some combination thereof, and so forth.

Figure 6:
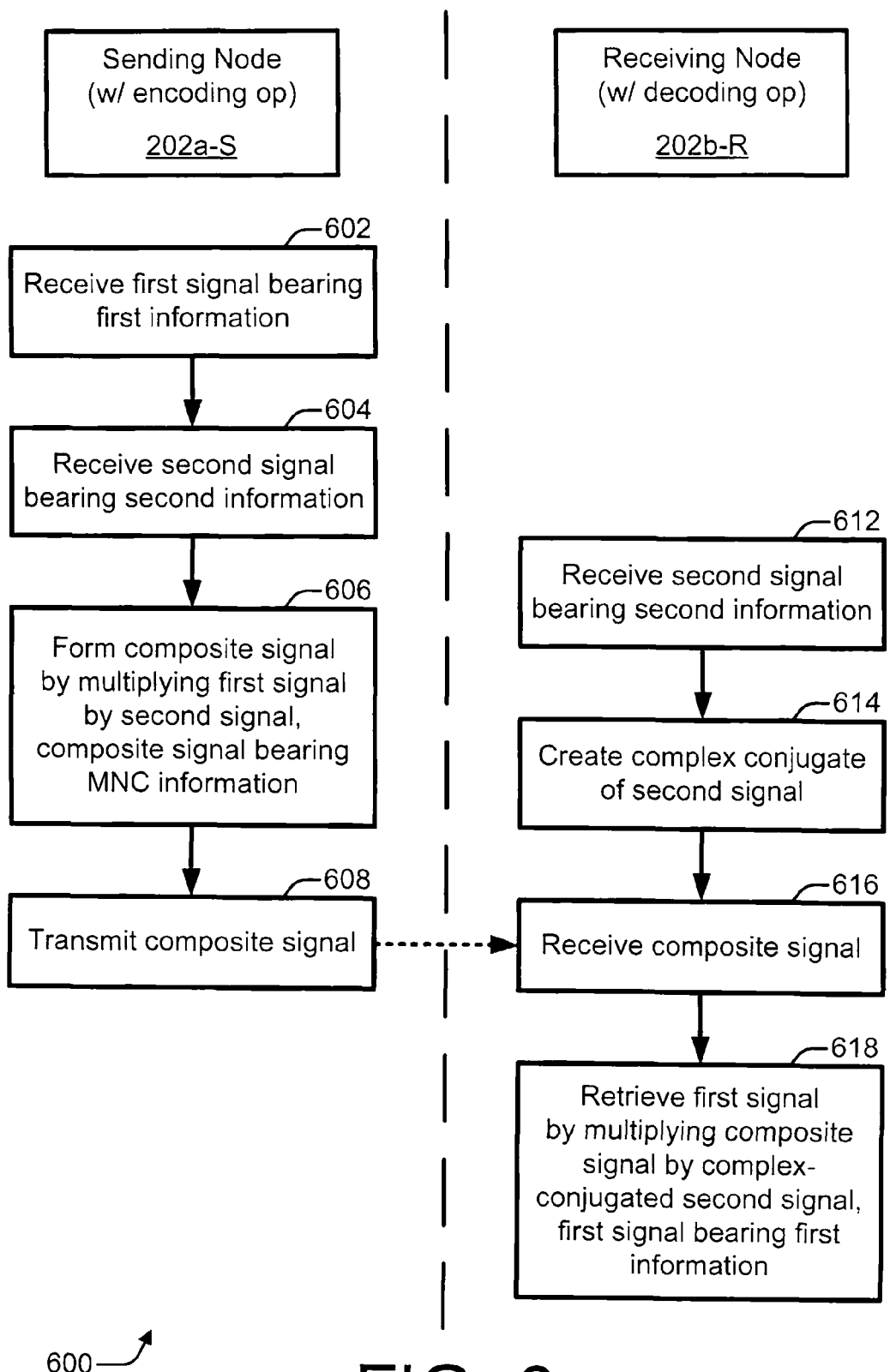
FIG. 6 is a flow diagram of a method for an example embodiment of multiplicative network coding with two communication nodes.

FIG. 6 is a flow diagram 600 of a method for an example embodiment of multiplicative network coding with two communication nodes 202. A sending node 202a-S is adapted to perform an encoding operation, and a receiving node 202b-R is adapted to perform a decoding operation. Flow diagram 600 includes eight blocks 602-608 and 612-618. Sending node 202a-S is adapted to perform the acts of blocks 602-608. Receiving node 202b-R is adapted to perform the acts of blocks 612-618.

Although not so limited, the description below of flow diagram 600 also references certain elements of other FIGS. (e.g., FIGS. 2, 4, and 5) to facilitate understanding of example embodiments. Also, the acts of the described blocks may be performed in order(s) that differ from the illustrated one. For example, the acts) of block 612 and/or 614 may be performed after that of block 616. It should also be understood that a communication node may function as a sending node at one time and/or for one communication flow and as a receiving node at another time and/or for another communication flow.

In an example embodiment, at block 602, a first signal bearing first information is received. For example, sending node 202a-S may receive first signal 210(1) bearing first information A via a receiver 504 of a communication interface 206. At block 604, a second signal bearing second information is received. For example, sending node 202a-S may receive second signal 210(2) bearing second information B via receiver 504.

At block 606, a composite signal is formed by multiplying the first signal by the second signal, with the resulting composite signal bearing MNC information. For example, a multiplicative encoder 204E of a multiplicative network coder 204 of sending node 202a-S may multiply first signal 210(1) by second signal 210(2) to form composite signal 208. Composite signal 208 includes MNC information 212. Hence, composite signal 208 carries a product of the first information A and the second information B.

At block 608, the composite signal is transmitted. For example, sending node 202a-S may transmit composite signal 208 via a transmitter 502 of communication interface 206 to (i.e., directly or indirectly to) receiving node 202b-R. The composite signal is received as described below with reference to block 616.

At block 612, the second signal bearing second information is received. For example, receiving node 202b-R may receive second signal 210(2) bearing second information B via a receiver 504 of a communication interface 206. At block 614, a complex conjugate of the second signal is created. For example, receiving node 202b-R may create complex-conjugated signal 210*(2) from second signal 210(2).

At block 616, the receiving node receives the composite signal. For example, receiving node 202b-R may receive via receiver 504 composite signal 208 directly or indirectly from sending node 202a-S.

At block 618, the first signal is retrieved by multiplying the composite signal by the complex-conjugated second signal, with the retrieved first signal bearing the first information. For example, receiving node 202b-R may multiply composite signal 208 by complex-conjugated second signal 210*(2) to retrieve first signal 210(1), which bears first information A.

As noted above, the performance of network coding can increase throughput, reduce delay, and/or enhance the energy efficiency of a network. An example purpose for sending a composite signal may be gleaned from the following scenario. Assume that another receiving node already knows the first signal but also wants the second signal. By transmitting from a sending node the composite signal formed from the product of the first and second signals, both of the receiving nodes may obtain their desired signal with one transmission instead of two. Example scenarios for performing network coding are described in greater detail herein below with particular reference to FIGS. 7 and 8.

Figure 7:
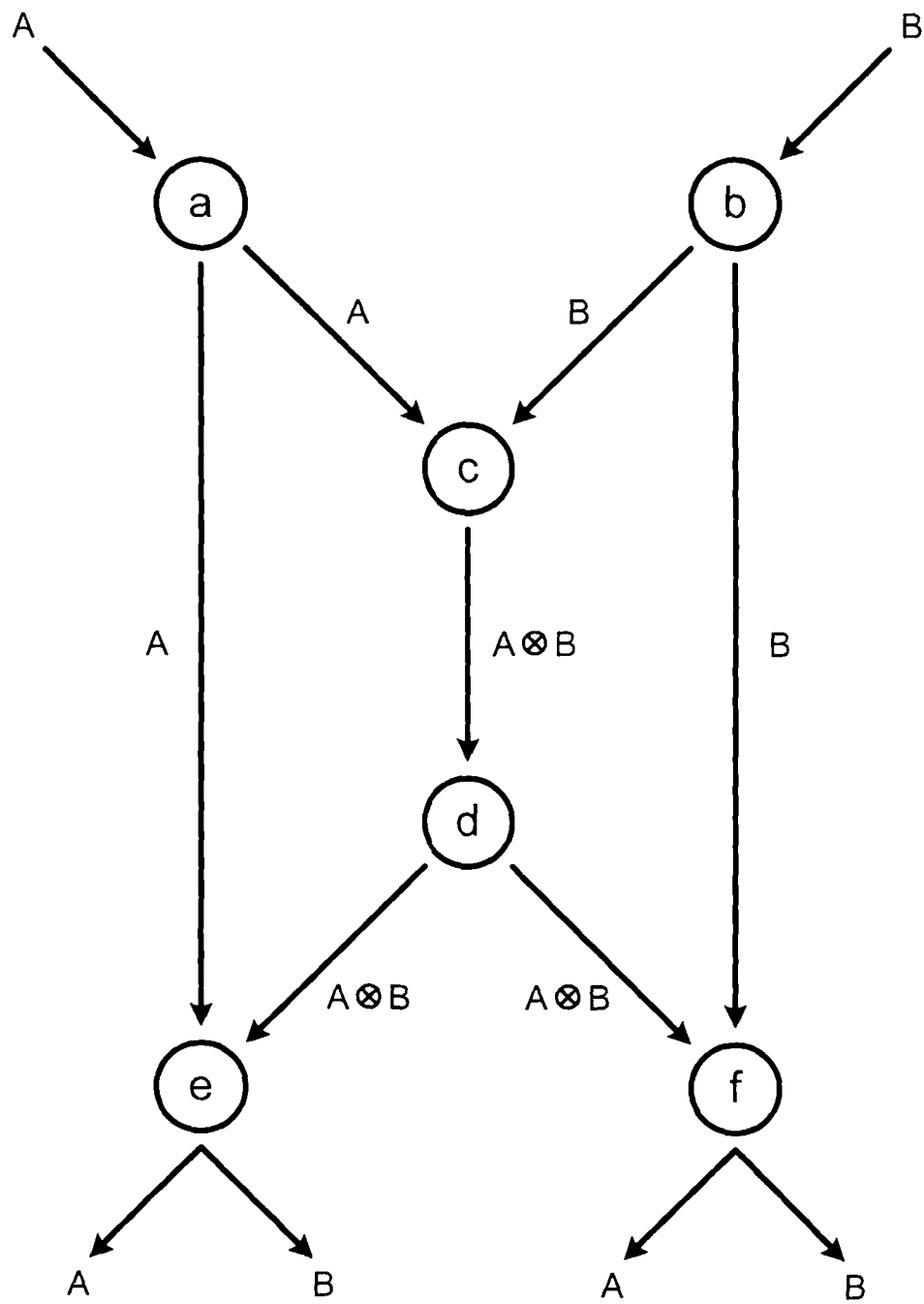
FIG. 7 illustrates a network diagram in which an example approach to multiplicative network coding is performed among communication nodes.

FIG. 7 illustrates a network diagram 700 in which an example approach to multiplicative network coding is performed among communication nodes. As illustrated, network diagram 700 includes six nodes: a, b, c, d, e, and f. There are two information flows: A and B. The two sources of the information flows are nodes a and b. The two destinations for the information flows are nodes e and f.

Figure 1:
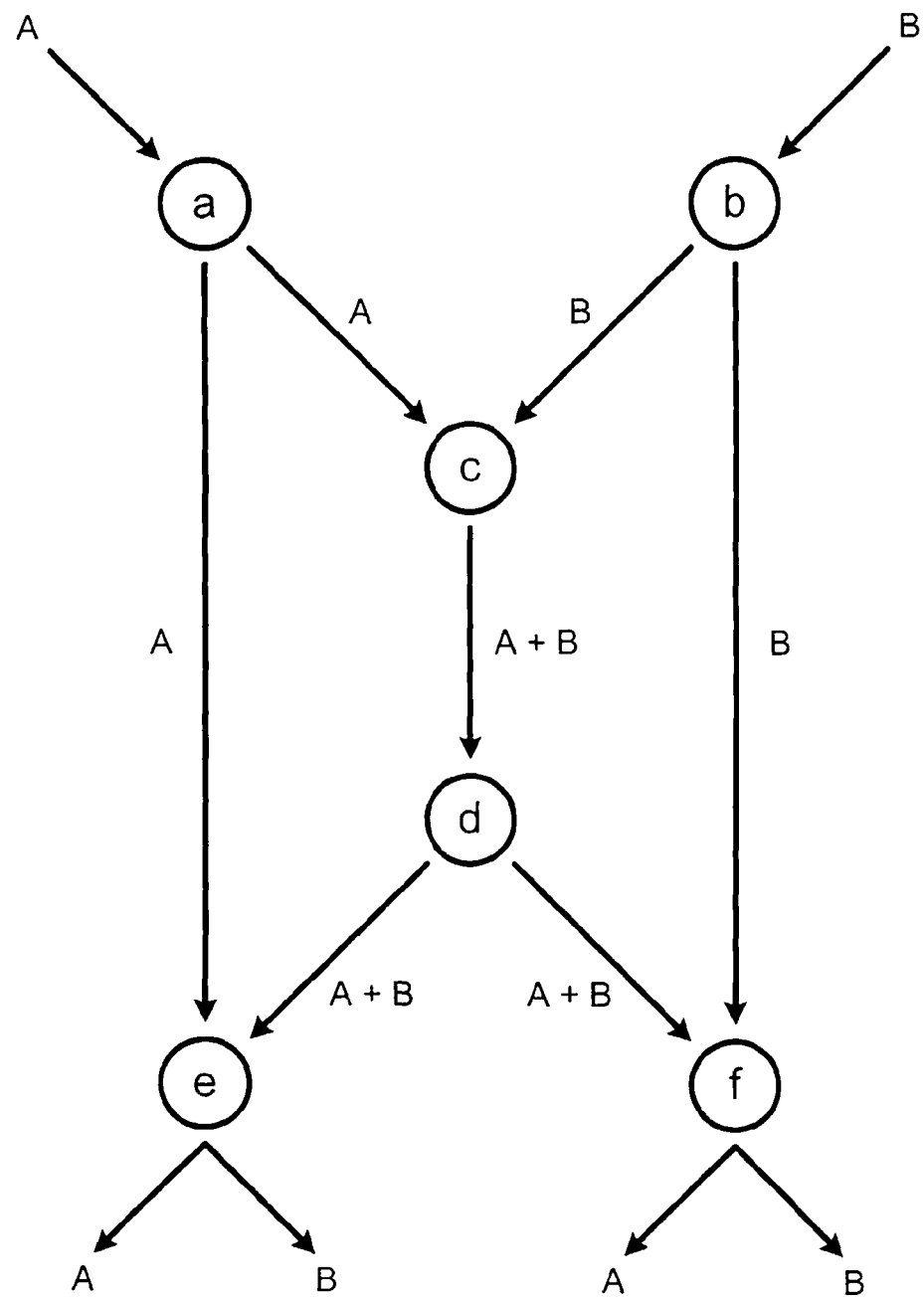
FIG. 1 is an example network diagram in which a conventional approach to network coding is implemented among communication nodes.

In other words, network diagram 700 is similar to network diagram 100 (of FIG. 1). However, for an example embodiment, multiplicative network coding with phase-modulated signals and complex multiplication is performed in network diagram 700. As noted above, multiplicative network coding can provide improved performance in certain situations, such as noisy environments.

Node a initiates information A into the network and transmits it to intermediate node c. Node b initiates information B into the network and transmits it to node c. Node c performs multiplicative-network-coding encoding on information A and information B by multiplying them to form a composite signal that carries MNC information A⊗B. Thus, phase-modulated signals are multiplied together to produce MNC information A⊗B. This multiplication may be performed below FEC.

Node a transmits information A to node e. Node b transmits information B to node f. Node c transmits MNC information A⊗B to nodes e and f. More specifically, node c transmits MNC information A⊗B to another intermediate node d, and node d transmits MNC information A⊗B to node e and node f. Alternatively, node c may transit MNC information A⊗B directly to nodes e and f.

Both nodes e and f perform multiplicative-network-coding decoding operations. Node e multiplies the composite signal having MNC information A⊗B with the complex conjugate of information A to retrieve information B. Node f multiplies the composite signal having MNC information A⊗B with the complex conjugate of information B to retrieve information A. These complex-conjugate multiplication operations to recover the desired signal may be performed below FEC. With multiplicative network coding, the signal of information A, the signal of information B, and/or the signal of MNC information A⊗B may have a noise component.

FIG. 8 is a diagram illustrating an example CBR scenario 800 using multiplicative network coding with three communication nodes 202. As illustrated, CBR scenario 800 includes communication node $v_1$ 202 ($v_1$), communication node $v_2$ 202 ($v_2$), and communication node $v_3$ 202 ($v_3$). These three communication nodes are wireless nodes, but CBR may also be applied to wired nodes of a wired network. Three transmissions are made at three times T1, T2, and T3. Transmit powers for communication nodes $v_1$, $v_2$, and $v_3$ are $P_1$, $P_2$, and $P_3$, respectively. The channel effects between node $v_1$ and $v_3$ are modeled with $h_1$, and the channel effects between node $v_2$ and $v_3$ are modeled with $h_2$.

The following example scenario is presented for CBR scenario 800. Communication node $v_1$ wants to send a message to communication node $v_2$ and vice versa. A 3-phase protocol is employed here. This means that node $v_1$ sends its message to the relay station, node $v_3$. Node $v_2$ also sends its message to the relay station node $v_3$. Subsequently, the relay station node $v_3$ sends an encoded composite signal that is created by multiplying the two messages from nodes $v_1$ and $v_2$.

For the sake of descriptive simplicity, it is assumed that the channels are reciprocal. In other words, it is assumed that the complex channel gain to noise variance is approximately identical independent of direction. However, it should be understood that such reciprocity is not required to successfully perform multiplicative network coding.

Also, as described in PCT Published Application No. WO 2006/071187, soft combining for CBR may be performed. Soft combining involves one or more network-coded data packets and regular data packets. With multiplicative network coding, the versions of the signals that are directly received in the first and second phases may be used for MRC with the network-coded decoded signals at each respective node. Consequently, when employing MRC with multiplicative network coding, the directly-received version of the signal's SNR and the network-coded decoded signal's SNR are added. For notational simplicity, the presence of the direct signal and application of MRC are omitted from the mathematical description below of CBR scenario 800.

Four different cases are described with regard to CBR scenario 800. Each case can be distinguished depending on whether the relay node $v_3$ can decode a received message. These four cases are: [1] relay node $v_3$ can decode both $v_1$ message and $v_2$ message, [2] relay node $v_3$ can decode $v_1$ message but not $v_2$ message, [3] relay node $v_3$ can decode $v_2$ message but not $v_1$ message, and [4] relay node $v_3$ can not decode either $v_1$ message or $v_2$ message.

Case [1] is that relay node $v_3$ can decode both the $v_1$ message and the $v_2$ message. The relay node $v_3$ sends $\alpha s_1 s_2$, where $\alpha$ is a scaling factor that in this case is equal to the square root of the transmit power $\sqrt{P_3}$. The two receiving nodes $v_1$ and $v_2$ receive the composite signals $r_1=h_1\alpha s_1 s_2+w_1$ and $r_2=h_2\alpha s_1 s_2+w_2$, respectively. Each node having knowledge of what it had previously sent, it can undo the impact of its own signal such that $r_1 s^*_1=h_1\alpha s_2+w'_1$ and $r_2 s^*_2=h_2\alpha s_1+w'_2$, respectively. The resulting SNR is $\Gamma_{31}=P_3 G_1/\sigma^2$ and $\Gamma_{32}=P_3 G_2/\sigma^2$ at nodes $v_1$ and $v_2$, respectively. (For simplicity in the above SNR equations, it has been assumed without limitation that the noise variances are the same.)

Case [2] is that relay node $v_3$ can decode the $v_1$ message but not the $v_2$ message. The relay node $v_3$ sends $\alpha s_1 r_{3(2)}=\alpha s_1(h_2\sqrt{P_2}s_2+w_{3(2)})$, where $\alpha$ is a scaling factor that normalizes the transmit power to $P_3$. In other words, $\alpha=\sqrt{P_3}/\sqrt{G_2 P_2+\sigma^2}$. The variable $r_{3(2)}$ is the received noisy signal in relay node $v_3$ from node $v_2$, whereas $w_{3(2)}$ is the noise left on top of the undecoded message from node $v_2$ in relay node $v_3$.

The receiving nodes $v_1$ and $v_2$ receive the composite signals $r_1=h_1\alpha s_1 r_{3(2)}+w_1$ and $r_2=h_2\alpha s_1 r_{3(2)}+w_2$. Each node having knowledge of what it had previously sent, it can undo the impact of its own signal such that $r_1 s^*_1=h_1\alpha r_{3(2)}+w'_1=h_1\alpha(h_2\sqrt{P_2}s_2+w_{3(2)})+w'_1$ and $r_2 s^*_2=h_2\alpha r_{3(2)}+w'_2=h_2\alpha(h_2\sqrt{P_2}s_2+w_{3(2)})+w'_2$ for node $v_1$ and node $v_2$, respectively. The resulting SNR is $\Gamma_1=\Gamma_{23}\Gamma_{31}/(1+\Gamma_{23}+\Gamma_{31})$ and $\Gamma_2=\Gamma_{23}\Gamma_{32}/(1+\Gamma_{23}+\Gamma_{32})$, where $\Gamma_{23}=P_2 G_2/\sigma^2$.

Case [3] is that relay node $v_3$ can decode the $v_2$ message but not the $v_1$ message. This permutation is analogous to that of case [2], but the signal from $v_2$ is decoded and the one from $v_1$ remains noisy. Hence, in this case the noisy signal from $v_1$ is multiplied with $s_2$ and forwarded from the relay node $v_3$. This results in the following SNRs for nodes $v_1$ and $v_2$, respectively: $\Gamma_1 = \Gamma_{13}\Gamma_{31}/(1+\Gamma_{13}+\Gamma_{31})$ and $\Gamma_2 = \Gamma_{13}\Gamma_{32}/(1+\Gamma_{13}+\Gamma_{32})$, where $\Gamma_{13} = P_1 G_1 / \sigma^2$.

Case [4] is that relay node $v_3$ can not decode either the $v_1$ message or the $v_2$ message. Even if neither of the messages can be decoded in the relay node, they may still be multiplied to form a composite signal, but the noisiness increases. The relay node $v_3$ transmits $\alpha r_{3(1)} r_{3(2)} = \alpha(h_1\sqrt{P_1}s_1 + w_{3(1)})(h_2\sqrt{P_2}s_2 + w_{3(2)})$ as the composite signal.

The composite signal is expanded in its components, and the noise is replaced with a statistically-equivalent noise term:

$$\alpha r_{3(1)} r_{3(2)} = \alpha(h_1\sqrt{P_1}s_1 h_2\sqrt{P_2}s_2 + h_2\sqrt{P_2}w'_{3(1)} + h_1\sqrt{P_1}w'_{3(2)} + w_{3(1)}w_{3(2)}).$$

As is apparent from the composite signal, the two noise terms are multiplied with each other. This term can be neglected in the following analysis so as to provide an upper SNR bound because this term is small for the medium-to-high SNR ranges (for which the analysis is particularly applicable), and the statistics of two complex Gaussian random variables is non-complex Gaussian after multiplication of them. Even though the multiplicative terms of the noise are neglected in the analysis, the proper power normalization is utilized:

$$\alpha = \sqrt{P_3}/\sqrt{(G_1 P_1 + \sigma^2)(G_2 P_2 + \sigma^2)}.$$

After noise is added upon reception, the receivers operate as before. They multiply the received composite signal with the complex conjugate of their respective known signals. More specifically, the receiving nodes $v_1$ and $v_2$ receive the composite signals $r_1 = h_1 \alpha r_{3(1)} r_{3(2)} + w_1$ and $r_2 = h_2 \alpha r_{3(1)} r_{3(2)} + w_2$. Each node having knowledge of what it had previously sent, it can undo the impact of its own signal such that $r_1 s^*_1 = \alpha h_1 h_2 \sqrt{P_1}\sqrt{P_2} s_2 + w'_1$ and $r_2 s^*_2 = \alpha h_1 h_2 \sqrt{P_1}\sqrt{P_2} s_1 + w'_2$. After some calculation, the SNRs can be derived. The inverse SNR upper bounds are $\Gamma_1^{-1} = \Gamma_{13}^{-1} + \Gamma_{23}^{-1} + \Gamma_{31}^{-1}(1+\Gamma_{13}^{-1})(1+\Gamma_{23}^{-1})$ and $\Gamma_2^{-1} = \Gamma_{13}^{-1} + \Gamma_{23}^{-1} + \Gamma_{32}^{-1}(1+\Gamma_{13}^{-1})(1+\Gamma_{23}^{-1})$ for nodes $v_1$ and $v_2$, respectively.

An example embodiment of CBR with multiplicative network coding can offer performance improvements. The performance generally depends on PSK constellation size in combination with which FEC method is employed. The performance for case [1] in which the relay node decodes both signals can provide, assuming $P_1 G_1 = P_2 G_2$ for simplicity, a 33% throughput increase relative to a classical 4-phase scheme. The reason for this increase is that the same amount of information is transferred in only ¾ of the time consumed as compared to the 4-phase scheme.

When one of the messages is not decoded in the relay node $v_3$, both nodes $v_1$ and $v_2$ likely suffer somewhat from the noise that remains in the composite signal that is sent out. In contrast, for the 4-phase scheme, because the relay node transmits twice, only the receiver node that is actually receiving the noisy message is harmed. Hence, a performance comparison between the 3-phase CBR scheme and the classical 4-phase scheme for such permutations depends, at least partially, on a selected FEC code and PSK constellation size. In general, however, there will likely be some gain because of the 4/3 throughput increase.

Different embodiment (s) of the invention can offer one or more advantages. Generally, multiplicative network coding provides an alternative network-coding encoding and decoding approach as compared to traditional network coding. For example, certain embodiment (s) of multiplicative network coding provide a relatively low complexity method for the network-coding encoding of a noisy signal and a non-noisy signal into a composite signal. Also, certain embodiment(s) provide a relatively low complexity method for the network-coding decoding of a composite signal without precise knowledge of channel state information. The prior decoding signals may also be noisy. Furthermore, certain embodiment(s) of multiplicative network coding may involve network-coding encoding and/or decoding with a fixed absolute magnitude of the signals and non-coherent detection of the network-coded decoded signal.

Different embodiment (s) of the invention can offer one or more of the following further advantages. For example, throughput may be increased by enabling full transmit times per data stream and by enabling use on different links with dissimilar SNRs. Also, embodiments can enable direct operation on baseband signals, or even radio frequency signals, if the hardware so permits. Additionally, the baseband or radio frequency layer in a multiplicative-network-coding-enabled relay/repeater may be utilized. This may provide reduced hardware complexity and/or cost. Moreover, embodiments may be relatively latency-free, cellular HARQ friendly, and network-coding enabled in a FDD repeater when network-coding noisy non-decoded signals. Furthermore, the SNR, or signal and noise statistics, is conserved under network decoding with noise-free signals. A noisy signal may, however, be used if desired when encoding and/or as the a priori known information when decoding.

Although multiple embodiments of the present invention have been illustrated in the accompanying Drawings and described in the foregoing Detailed Description, it should be understood that the invention is not limited to the disclosed embodiments, for it is also capable of numerous rearrangements, modifications and substitutions without departing from the scope of the invention as set forth and defined by the following claims.

The invention claimed is:

1. A communication node adapted to perform multiplicative network coding, the communication node comprising:
   an encoder to perform an encoding operation;
   a decoder to perform a decoding operation;
   where:
      said encoder is configured to multiply two or more signals that bear information to form a composite signal that comprises multiplicatively network coded information, where the two or more signals that bear information are each defined by a respective equation having a form of $s_k(n) = e^{j\phi_k(n)}$ that has a variable n and a variable k, and where the variable n is an index for a symbol carrying a piece of the information and the variable k is an index for a full set of the information to which the signal is associated, wherein the information is an information flow comprising a set of related information pieces of data, voice, and/or multimedia communication; and
      said decoder is configured to multiply a received composite signal by the complex conjugate of at least one of the two or more signals that bear information, wherein the received composite signal comprises multiplicatively network coded information; and
      the communication node is configured to at least partially perform multiplicative-network-coding encoding for a sending communication mode with the encoding operation; and the communication node is configured to at least partially perform multiplicative-network-coding decoding for a receiving communication mode with the decoding operation.

2. The communication node as recited in claim 1, where the complex conjugate of at least one of the two or more signals comprise at least one composite signal that has been complex conjugated.

3. The communication node as recited in claim 1, where the two or more signals that bear information have a phase domain and carry information in the phase domain of the two or more signals.

4. The communication node as recited in claim 3, where the two or more signals that bear information carry information in the phase domain of the two or more signals but not in a magnitude of the two or more signals.

5. The communication node as recited in claim 1, where the two or more signals that bear information each have a substantially constant absolute magnitude at least from symbol to symbol.

6. The communication node as recited in claim 1, where the communication node is to perform multiplicative-network-coding encoding or multiplicative-network-coding decoding to participate in a coded bi-directional relaying (CBR) scenario.

7. A method for a communication node adapted to perform multiplicative network coding, the method comprising:
    forming a composite signal that comprises multiplicatively network coded information;
    transmitting the composite signal;
    receiving the composite signal that comprises multiplicatively network coded information; and
    generating a decoded signal that bears information from the received composite signal;
    where:
        said forming comprises:
            forming the composite signal by multiplying two or more information bearing signals in an encoding operation, where the two or more information bearing signals are each defined by a respective equation having a form of $s_k(n)=e^{j\Phi_k(n)}$ that has a variable n and a variable k, and where the variable n is an index for a symbol carrying a piece of the information and the variable k is an index for a full set of the information to which the signal is associated, wherein the information is an information flow comprising a set of related information pieces of data, voice, and/or multimedia communication; and
        said generating a decoded signal that bears information from the received composite signal comprises:
            generating the decoded signal that bears information by multiplying the received composite signal by the complex conjugate of at least one of the two or more information bearing signals in the encoding operation, in a decoding operation;
    where the method further comprises:
        at least partially performing multiplicative-network-coding encoding for a sending communication mode, the multiplicative-network-coding encoding including the forming the composite signal; and
        at least partially performing multiplicative-network-coding decoding for a receiving communication mode, the multiplicative-network-coding decoding including the generating the decoded signal.

8. The method for a communication node adapted to perform multiplicative network coding as recited in claim 7, where said forming the composite signal comprises:
    multiplying the two or more information-bearing signals in which at least one of the two or more information-bearing signals includes a noise component.

9. The method for a communication node adapted to perform multiplicative network coding as recited in claim 7, where said generating the decoded signal comprises:
    multiplying the received composite signal with complex conjugate of at least one of the two or more information bearing signals in which at least one of the one or more complex-conjugated signals includes a noise component.

10. The method for a communication node adapted to perform multiplicative network coding as recited in claim 7, where said generating the decoded signal comprises:
    multiplying the received composite signal with complex conjugate of at least one of the two or more information bearing signals in which the received composite signal includes a noise component.

11. The method for a communication node adapted to perform multiplicative network coding as recited in claim 7, where said generating the decoded signal comprises:
    multiplying the received composite signal complex conjugate of at least one of the two or more information bearing signals in which the received composite signal is attenuated.

12. The method for a communication node adapted to perform multiplicative network coding as recited in claim 7, where said generating the decoded signal is performed on the received composite signal while the received composite signal is forward error correction (FEC) encoded; and
    where the method further comprises:
        after said generating the decoded signal, performing FEC decoding on the decoded signal that bears information.

13. The method for a communication node adapted to perform multiplicative network coding as recited in claim 7, where the received composite signal includes a complex channel magnitude component having a value; and
    where said generating the decoded signal comprises:
        generating the decoded signal that bears information by multiplying the received composite signal without knowing the value of the complex channel magnitude component of the received composite signal.

14. The method for a communication node adapted to perform multiplicative network coding as recited in claim 7, further comprising:
    extracting the information from the decoded signal that bears information by further processing the decoded signal.

15. The method for a communication node adapted to perform multiplicative network coding as recited in claim 14, where said extracting comprises:
    extracting the information from the decoded signal that bears information without performing equalization on the received composite signal or on the decoded signal that bears information.

16. The method for a communication node adapted to perform multiplicative network coding as recited in claim 14, where said extracting comprises:
    performing forward error correction (FEC) decoding on the decoded signal that bears information; and
    demodulating the decoded signal to extract the information.

17. The method for a communication node adapted to perform multiplicative network coding as recited in claim 14, where said extracting comprises:
    performing maximum ratio combining (MRC) on the decoded signal that bears information and a directly-received version of the signal that bears information.

18. A system that is adapted to perform multiplicative network coding, the system comprising:
a first communication node; and
a second communication node;
where:
the first communication node includes a multiplicative encoder, a transmitter, and a first receiver;
the first receiver is configured to receive a first signal bearing first information and a second signal bearing second information, where the first and second signals are each defined by a respective equation having a form of $s_k(n)=e^{j\Phi_k(n)}$ that has a variable n and a variable k, and where the variable n is an index for a symbol carrying a piece of the information to which the signal is associated and the variable k is an index for a full set of the information to which the signal is associated, wherein the first information is a first information flow comprising a set of related information pieces of data, voice, and/or multimedia communication, and wherein the second information is a second information flow comprising a set of related information pieces of data, voice, and/or multimedia communication;
the multiplicative encoder is configured to form a composite signal by multiplying the first signal and the second signal, the composite signal bearing multiplicatively-network-coded information including the first information and the second information; and
the transmitter is configured to transmit the composite signal; and
the second communication node includes a multiplicative decoder and a second receiver;
the second receiver is configured to receive the composite signal from the transmitter of said first communication node, the second receiver is further configured to receive the second signal bearing the second information; and
the multiplicative decoder is configured to create a complex conjugate of the second signal, the multiplicative decoder is further configured to retrieve the first signal by multiplying the composite signal by the complex conjugate of the second signal, the retrieved first signal bearing the first information.

19. A memory device comprising non-transitory processor-executable instructions adapted to perform multiplicative-network-coding and decoding encoding that, when executed, direct a communication node to perform a method comprising:
receiving a first signal bearing first information, where the first signal is defined by an equation having a form of $s_k(n)=e^{j\Phi_k(n)}$ that has a variable n and a variable k, and where the variable n is an index for a symbol carrying a piece of the first information and the variable k is an index for a full set of the first information, wherein the first information is a first information flow comprising a set of related information pieces of data, voice, and/or multimedia communication;
receiving a second signal bearing second information, where the second signal is defined by an equation having a form of $s_k(n)=e^{j\Phi_k(n)}$ that has a variable n and a variable k, and where the variable n is an index for a symbol carrying a piece of the second information and the variable k is an index for a full set of the second information, wherein the second information is a second information flow comprising a set of related information pieces of data, voice, and/or multimedia communication;
generating a composite signal by multiplying the first signal by the second signal in an encoding operation, the composite signal comprising multiplicatively-network-coded first information and second information; and
transmitting the composite signal to another node; receiving a multiplicatively-network-coded composite signal from the another node; creating a complex conjugate of the second signal; creating an information bearing signal from the another node by multiplying the multiplicatively-network-coded composite signal by the complex conjugate of the second signal,
where the method includes at least partially performing multiplicative-network-coding encoding, the multiplicative-network-coding encoding including the forming the composite signal.

* * * * *

UNITED STATES PATENT AND TRADEMARK OFFICE
CERTIFICATE OF CORRECTION

| | |
|---|---|
| PATENT NO. | : 8,792,539 B2 |
| APPLICATION NO. | : 12/679345 |
| DATED | : July 29, 2014 |
| INVENTOR(S) | : Larsson |

It is certified that error appears in the above-identified patent and that said Letters Patent is hereby corrected as shown below:

In the Specification

In Column 5, Line 37, delete "Amore" and insert -- A more --, therefor.

In Column 10, Line 25, delete "acts)" and insert -- act (s) --, therefor.

In the Claims

In Column 16, Line 20, in Claim 11, delete "signal" and insert -- signal with --, therefor.

Signed and Sealed this
Sixteenth Day of June, 2015

Michelle K. Lee
*Director of the United States Patent and Trademark Office*